(12) United States Patent  (10) Patent No.: US 7,677,293 B2
Allsopp  (45) Date of Patent: Mar. 16, 2010

(54) CENTRE-PIN PLUG

(75) Inventor: Reginald Charles Allsopp, Cheshire (GB)

(73) Assignee: Louver-Lite Limited, Cheshire (GB)

( * ) Notice: Subject to any disclaimer, the term of this patent is extended or adjusted under 35 U.S.C. 154(b) by 655 days.

(21) Appl. No.: 11/364,905

(22) Filed: Feb. 21, 2006

(65) Prior Publication Data

US 2007/0007100 A1 Jan. 11, 2007

(30) Foreign Application Priority Data

Jul. 8, 2005 (EP) .................................. 05254303

(51) Int. Cl.
*E06B 9/17* (2006.01)
(52) U.S. Cl. .................... 160/323.1; 160/321; 403/318; 403/319; 411/45
(58) Field of Classification Search ............. 160/323.1, 160/321; 411/45, 46, 47, 48, 508, 359; 403/289, 403/291, 375, 318, 319
See application file for complete search history.

(56) References Cited

U.S. PATENT DOCUMENTS

| 3,719,378 | A | * | 3/1973 | Windsor | 403/289 |
| 4,009,745 | A | * | 3/1977 | Erpenbeck | 160/297 |
| 4,372,432 | A | * | 2/1983 | Waine et al. | 192/223.4 |
| 4,865,109 | A | * | 9/1989 | Sherman | 160/321 |
| 6,158,563 | A | | 12/2000 | Welfonder et al. | |
| 6,173,825 | B1 | * | 1/2001 | Liu | 192/223.4 |
| 6,634,843 | B1 | * | 10/2003 | Tarnow et al. | 411/508 |
| D541,566 | S | * | 5/2007 | Allsopp | D6/580 |
| 2003/0085003 | A1 | * | 5/2003 | Cheng | 160/321 |
| 2005/0039866 | A1 | | 2/2005 | Allsopp | |

* cited by examiner

*Primary Examiner*—Blair M. Johnson
(74) *Attorney, Agent, or Firm*—Haugen Law Firm PLLP

(57) ABSTRACT

The invention relates to a plug for releasable engagement with the centre-pin of a roller blind control unit wherein engagement of the plug with the pin ensures that a tip of the center-pin engages an external surface of the control unit. In addition, a releasably inter-engaging combination of this plug and center-pin wherein insertion of the center-pin through a roller blind control unit and engagement with the plug, ensures that a tip of the center-pin engages an external surface of the control unit is described. The invention also relates to a control unit for use in a window blind head rail assembly comprising: a sprocket wheel, a sprocket support and wrap spring, a splined bush for engagement with a roller blind tube, a center-pin, and a plug for releasable engagement with the center-pin.

22 Claims, 5 Drawing Sheets

CENTRE-PIN PLUG

CROSS-REFERENCE TO RELATED APPLICATION

This application claims priority from European patent application serial number 05254303.0, filed on Jul. 8, 2005 and entitled CENTRE-PIN PLUG, the content of which is incorporated herein in its entirety.

FIELD OF THE INVENTION

The present invention relates to a plug for use with control units, specifically control units for window blind systems. In addition, the invention relates to the combination of the plug with a centre-pin and to a control unit incorporating the plug.

BACKGROUND OF THE INVENTION

Due to the general inaccessibility of window blind head rails, and the complexity of modern blinds, it is necessary for window blinds to comprise a control unit, and many types are known in the art. The nature of the control unit will vary according to the type of blind with which it is being used, and the plug of the present invention is intended in particular but not exclusively to be used with a control unit which may be used to operate a manually operated roller blind type head rail.

A control unit for use with a roller blind type head rail will typically include a sprocket wheel in connection with a chain, a chain guard housing, and a sprocket support which facilitates controlled rotation of a splined bush. The sprocket wheel rotates in response to movement of the chain by the user, with the sprocket support providing a controlled and limited resistance to rotation. This in turn causes the splined bush to rotate. The control unit engages the roller blind tube, causing an attached blind to raise or lower as a result of the operation of the chain. In this way, movement of the blind from an open to a closed position is achieved without excessive stretching or discomfort to the individual.

This mechanism is exemplified by the roller blind control units sold by the applicant, Louver-Lite Limited, in a variety of units designed to operate with blinds of various sizes.

These units comprise a sprocket wheel and housing. The sprocket wheel interacts with a wrap spring having outwardly projecting end juts. The wrap spring is in turn connected to a sprocket support by a sprocket spring friction surface. The sprocket support includes two engaging pins projecting from one face of the control unit. These are designed to engage with a metal or plastic wall or ceiling-mounted bracket, thereby providing a means for hanging the blind in front of a window or other aperture. The unit is held together by a centre-pin which extends substantially through the centre of the control unit and snap-fits into position relative to the external surface of the splined bush, thereby retaining each component in its optimum operating position.

UK Patent number GB 2392703 illustrates modifications that may be made to these control units. For instance, the centre-pin may comprise one or more fins projecting axially from a head of the centre-pin which engage with co-operating recesses in the sprocket support. This reduces the rotational degree of freedom available to the centre-pin head reducing the wear of this component which could otherwise arise due to the rotational stress applied by the blind. Further, the sprocket wheels of the embodiment of these patents may be rotated relative to the chain guard housing, allowing the chain to be fed into the control unit without the need to dismantle the unit. In addition, the chain guard housing described in the above patent may include a lug extending perpendicular to the face of the control unit which incorporates the sprocket support to aid positioning of the control unit relative to its mounting brackets. Also described is a wrap spring with circular cross-section but flattened juts. This wrap spring improves the contact of the spring with the sprocket wheel relative to springs of purely circular cross-section, without compromising on the grip of the spring on the sprocket support.

In all of the above referred to embodiments, movement of a roller blind chain causes rotation of the sprocket wheel and releases the wrap spring clutch. The sprocket wheel component of this control unit also interacts with a splined bush which, as a result, rotates upon movement of the sprocket wheel. The external surface of the splined bush is connected with the roller blind tubing, facilitating rotation and therefore raising or lowering of the blind as a result of movement of the chain.

However, the above designs could be improved. Specifically, it has been found that where a control unit is operating at its maximum capacity in terms of the width or weight of the blind being carried and moved by the unit with which it is used, it becomes particularly important that the centre-pin and splined bush are fully engaged. Where the blind assembler has not ensured that the splined bush is appropriately positioned by snap fitting over the tip of the centre-pin, the splined bush may slowly work loose causing the blind to cease rotating or fall away from its mountings. This potential danger to the user, especially in situations where the control unit is being used with blinds of a width and/or weight at the upper end of the load bearing capacity of the unit needs to be overcome.

Therefore, according to a first aspect of the invention there is provided a plug for releasable engagement with the centre-pin of a roller blind control unit wherein engagement of the plug with the pin ensures that a tip of the centre-pin engages an external surface of the control unit.

Engagement of the plug with the centre-pin ensures that the centre-pin has been fully inserted into the control unit and that the splined bush is correctly positioned over the centre-pin tip. The plug is designed so that it may only engage with the centre-pin when the splined bush has been fully snap-fitted into position over the centre-pin tip. Accordingly, the presence of the plug ensures proper assembly of the control unit thereby preventing loosening of the splined bush and consequent failure of the blind.

According to a second aspect of the invention there is provided a releasably inter-engaging combination of a plug and centre-pin for use, for example, with a roller blind control unit wherein insertion of the centre-pin through a roller blind control unit and engagement with the plug, ensures that a tip of the centre-pin engages an external surface of the control unit.

According to a third aspect of the invention there is provided a control unit for use in a window blind head rail assembly comprising; a sprocket wheel, a sprocket support and wrap spring, a splined bush for engagement with the roller blind tube, a centre-pin, and a plug for releasable engagement with the centre-pin.

In an embodiment, the units are held together by a centre-pin which extends substantially through the centre of the control unit. The centre-pin extends from the face of the control unit incorporating the sprocket support, through the control unit to the rear of the unit. Preferably, the head of the pin comprises a stop element which is typically but not necessarily in the form of co-operating flattened surfaces in what is otherwise a generally tubular interface between the centre-pin and the sprocket support. The stop element engages the sprocket support and may include locking means which provide a point of connection with the mounting bracket. Where present, there is preferably a hooked tip on the locking means of the centre-pin stop element which prevents the blind from being pulled out of the bracket if the chain is pulled at a non-orthogonal angle from the aperture of the chain guard housing.

At the tip of the centre-pin is at least one locking lug, the splined bush snap fits over the centre-pin tip whereby the locking lug of the centre-pin engages a centre-pin engagement surface of the splined bush. This surface is typically an external surface of the splined bush. Further, it is preferred that this surface is the rear most surface of the splined bush (i.e. the surface closest to the centre of the blind when the blind is in use). The use of an integral locking lug provides a cheap and reliable means of securing the centre-pin.

Typically there will be more than one locking lug and preferably there will be two locking lugs separated by a single elongate recess in the centre-pin. It is however possible that more than two lugs may be present in the centre-pin of the invention; that locking lugs may be present on some or all of the arms produced by one or more elongate recesses cut into the body of the centre-pin; or that there may be more than one distinct locking lug on any one arm of the centre-pin.

The body of the centre-pin may be hollow or solid; preferably the body will be hollow, most preferably a generally hollow tube.

The arms of the centre-pin are typically biased towards an open position which is substantially parallel with the body of the centre-pin. However, during fitting of the splined bush over the locking lugs these may be deformed towards each other and into the space provided by the one or more elongate recesses. This allows the splined bush to be pushed over the locking lug and for the lugs to snap fit into engagement with the engagement surface of the splined bush.

To facilitate the snap-fit interaction, it is preferred that the locking lug of the centre-pin tip is substantially wedge shaped, more preferably the maximum annular height of the wedge will be at a point towards the head of the centre-pin. Where this is the case the annular height will preferably reduce along the length of the centre-pin towards the tip.

Once the splined bush is snapped into position, the plug of the invention may be interlocked with the centre-pin. The plug comprises at least one engaging member for releasable engagement with the centre-pin. Typically, the plug will comprise a shaft with an end and an engaging member extending from the shaft. The shaft may be of any cross-section but typically will be of substantially circular cross-section so that the shaft forms a cylinder; this cylinder may be solid or hollow. In a preferred embodiment, the engaging member extends from the shaft for releasable engagement with the centre-pin. Engagement may be by any means known in the art including bayonet fitting, snap fit interaction or friction fit.

Typically engagement will be via releasable retention of the engaging member with indents in the edges of one or more elongate recesses in the centre-pin. It is preferred that there are two engaging members, although three or more may be present. In an even more preferred embodiment the engaging members are positioned on directly opposite sides of the shaft of the plug and releasably interlock with two co-operating indents in a single elongate recess of the centre-pin. As with the shaft above, the engaging members may be of any cross-section but in preferred embodiments will be of substantially circular cross-section.

It is preferred, although not essential, that the shaft of the plug is of greater length than the engaging members. In addition, in a preferred embodiment the plug will include at its end a cap. The cap, where present, improves the visual appearance of the plug and of the combination of the plug with the control unit. The cap may be of any shape suitable for covering the end of the centre-pin, it is preferred, however, that the cap be a disc of greater diameter than the shaft of the plug. It is also preferred that the cap is of one-piece construction with the plug; typically the plug and cap will be produced by injection moulding techniques.

It is also preferred that the plug include recessed regions to reduce the amounts of material used in the construction of the plug. Typically these recessed regions will be in the shaft of the plug.

The centre-pin head may comprise one or more fins extending radially from the stop element and engaging with cooperating recesses in the annular internal face of the sprocket support. It is particularly advantageous for the fins to be present in control units for use with larger blinds, as the fins reduce the rotational movement available to the centre-pin head and stop element and accordingly, the wear on the centre-pin. When present, there will typically be between at least one and seven fins, which preferably will be equally spaced around the circular portion of the peripheral surface of the centre-pin. Conveniently, there will be three.

In use, the sprocket wheel interacts with the chain and the wrap spring causing controlled rotation of the wrap spring when the user moves the chain. Additionally, a moulded indent of the splined bush interacts with a cutaway portion on the sprocket wheel, causing transfer of the rotational force generated by pulling the chain to the splined bush. This, in turn, causes the splined bush, itself engaged with the roller blind tubing, to rotate causing the blind to move up or down in line with the direction in which the user pulls the chain.

Where present the chain guard housing of the invention covers the sprocket wheel and is substantially flush with the external face of the sprocket support when the unit is assembled. Covering the sprocket wheel in this way prevents the chain from becoming dislodged during use and provides a more aesthetically pleasing unit to the user.

The control unit also includes a sprocket support. The sprocket support comprises a roughly cylindrical portion and connected to one end, a collar, which forms the external face of the sprocket support, and which is substantially annular. The cylindrical element of this component extends directly from the inner edge of the sprocket support face engaging the sprocket wheel and providing a friction surface for interaction with the wrap spring. It is the interaction of this surface with the wrap spring which controls the speed of rotation of the elements of the control unit in use.

Preferably, the external face of the sprocket support comprises one or more engaging pins for engagement with the window blind mounting bracket. Typically, there will be two engaging pins. The sprocket support face may in some embodiments rotate within the chain guard housing.

Further, the external face of the sprocket support may include one or more recesses around the inner edge of the annular collar which forms this face of the sprocket support. These are adapted to engage with one or more of the fins which may optionally be present on the centre-pin stop element. If fins are utilized on the centre-pin, in all instances the recesses on the annular internal face of the sprocket support are dimensioned and positioned so as to cooperate with the fins.

A splined bush snap fits over the centre-pin whereby the locking lug of the centre-pin engages the centre-pin engagement surface. The splined bush has a moulded indent portion which, in the assembled unit, sits within the cutaway portion of the sprocket wheel and upon relative rotation the indent portion contacts the cutaway portion of the sprocket wheel component and as the sprocket wheel rotates, an edge of the cutaway portion rotates to contact an edge of the moulded indent on the splined bush, causing the splined bush to rotate. It is the rotation of splined bush which causes the tube to rotate, in turn causing the blind to be raised or lowered as required.

The chains suitable for use with this control unit would be well known to a person skilled in the art, and will typically be of either metal or plastic construction. Integral to the chain are a series of regularly spaced balls which when fed through the control unit interact with the sprocket wheel causing it to rotate.

With the exception of the wrap spring, the components of the control unit will typically be made from polymer plastics materials. The different components may be made from any thermoplastics materials, such as e.g. nylon, which are compatible with modern injection moulding techniques and known to those skilled in the art. Alternatively, where appropriate components may be made out of metals. The wrap spring is formed from metal, or a plastics material, preferably from metal and more preferably from steel.

Preferably, each individual component of the invention is formed separately from the other components and when made from plastics from one-piece of moulded plastics material.

An embodiment of the invention will now be described in detail, by way of example only, with reference to the accompanying drawings, in which:

DETAILED DESCRIPTION OF THE PREFERRED EMBODIMENTS

Figure 1A:
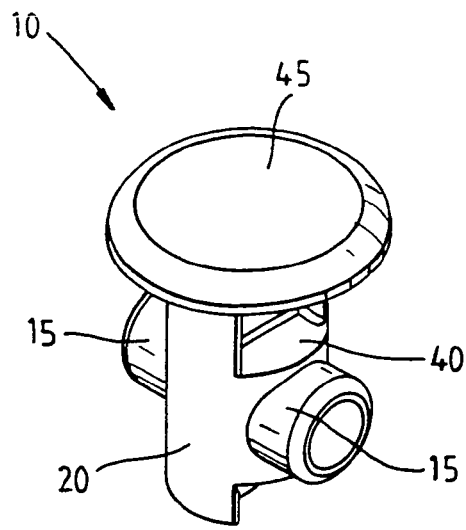
FIGS. 1a-1d are perspective views of the plug of the invention.
Figure 1B:
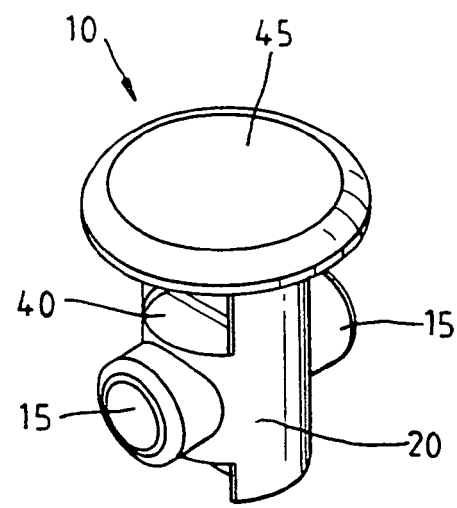
Figure 1C:
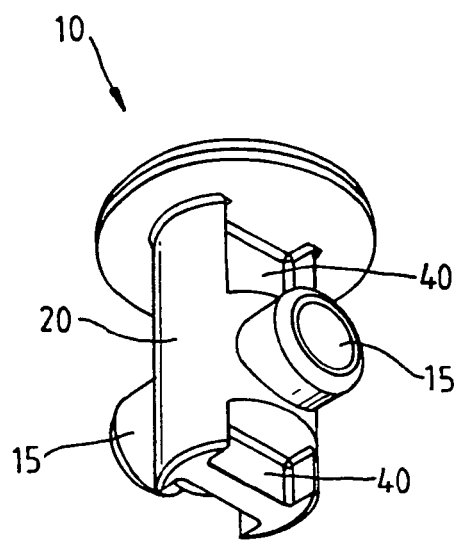
Figure 1D:
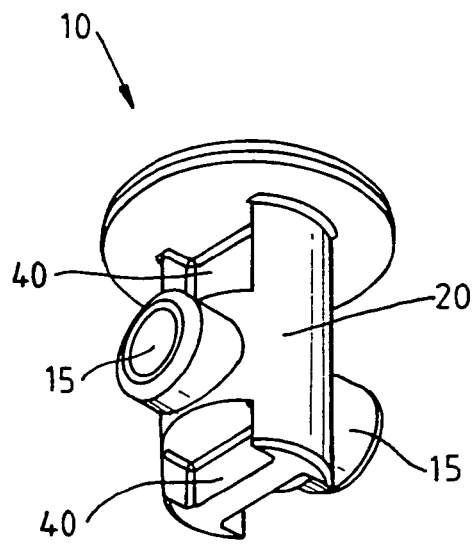

For the avoidance of doubt it should be noted that in this specification reference to 'up', 'down', 'upper', 'lower', 'vertical', 'horizontal', 'front', 'rear', 'back', 'bottom', 'top' and related terms refers to the orientation that the components of the blind adopt when installed for normal use, as they are shown in the figures.

Unless otherwise stated all sizes described herein are to be taken as modified by the word 'about'.

The objects and advantages enumerated above together with other objects, features, and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

With reference now to the drawing figures, and first to FIGS. 1a-1d illustrate the plug 10 of the invention. The plug 10 comprises two cylindrical engaging members 15 extending from opposite sides of a shaft 20 to releasably interlock with two co-operating indents 25 in a single elongate recess 30 of centre-pin 35. Engagement is via releasable retention of the engaging members 15 with the indents in the edges of the elongate recess 30 in the centre-pin 35. Shaft 20 is of substantially circular cross-section and includes recessed regions 40. The shaft 20 is roughly five times the length of the engaging members 15 and of twice the diameter. At one end of the plug 10 is a cap 45, the cap 45 is a flat disc of a larger diameter than the shaft 20. The diameter of the cap 45 is such that when the plug 10 is interlocked with the centre-pin 35 the blunt tip 50 of the centre-pin 35 is hidden. The plug 10 is of one-piece plastics construction.

Figure 2:
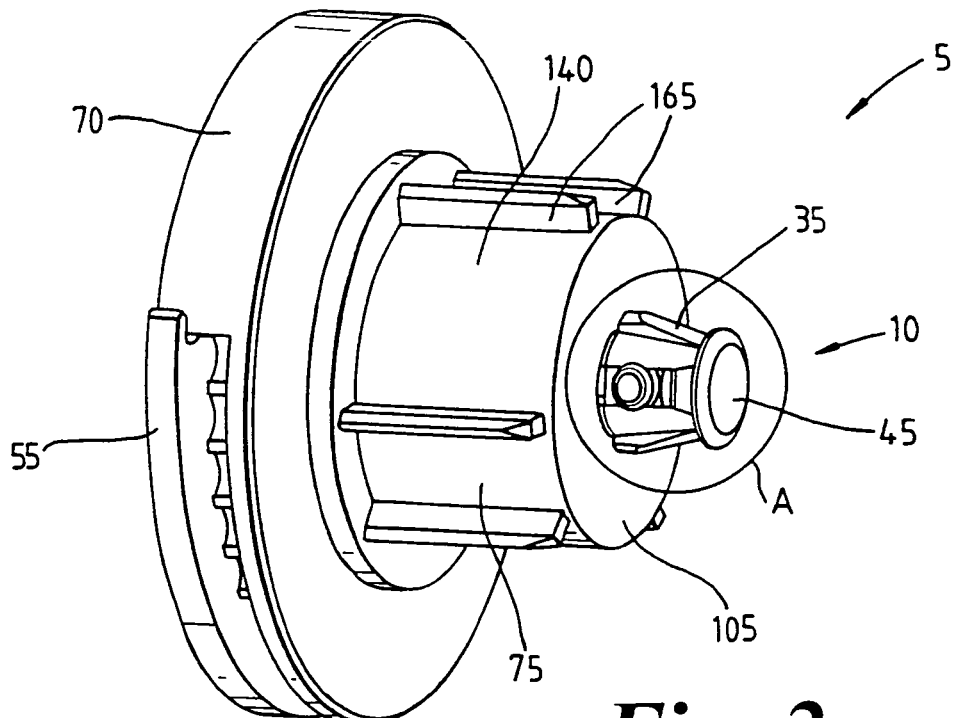
FIG. 2 is a perspective view from the rear of a control unit in which the centre-pin is engaged with the plug.
Figure 3:
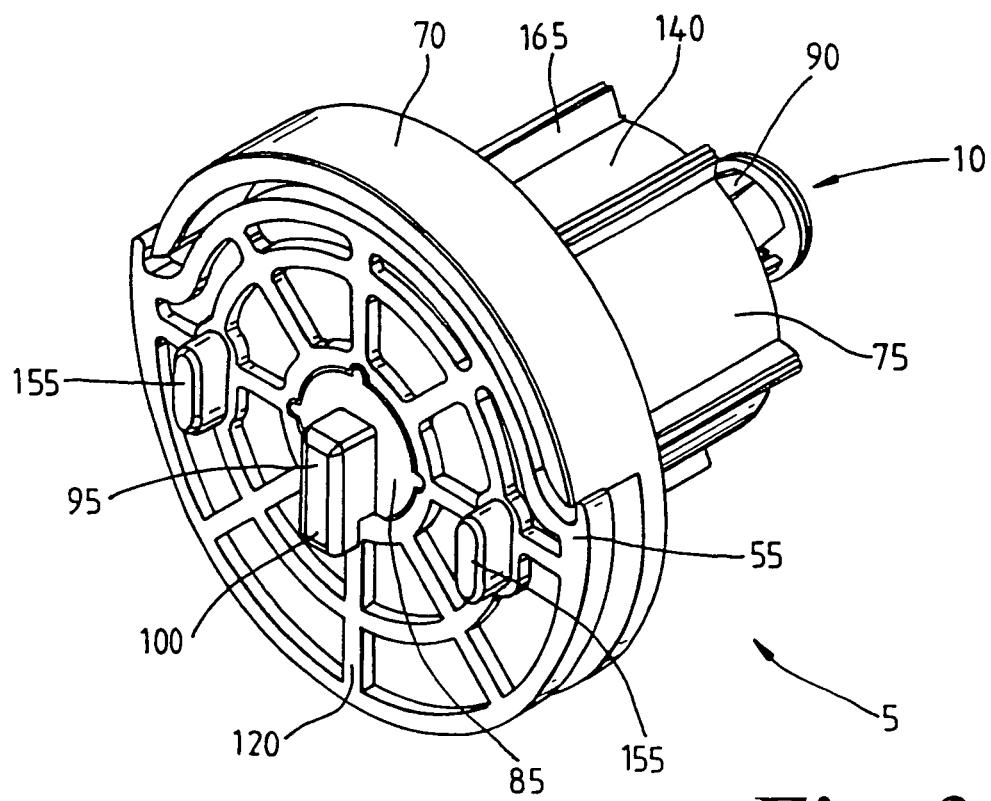
FIG. 3 is a perspective view from the front of the control unit of FIG. 2.
Figure 4:
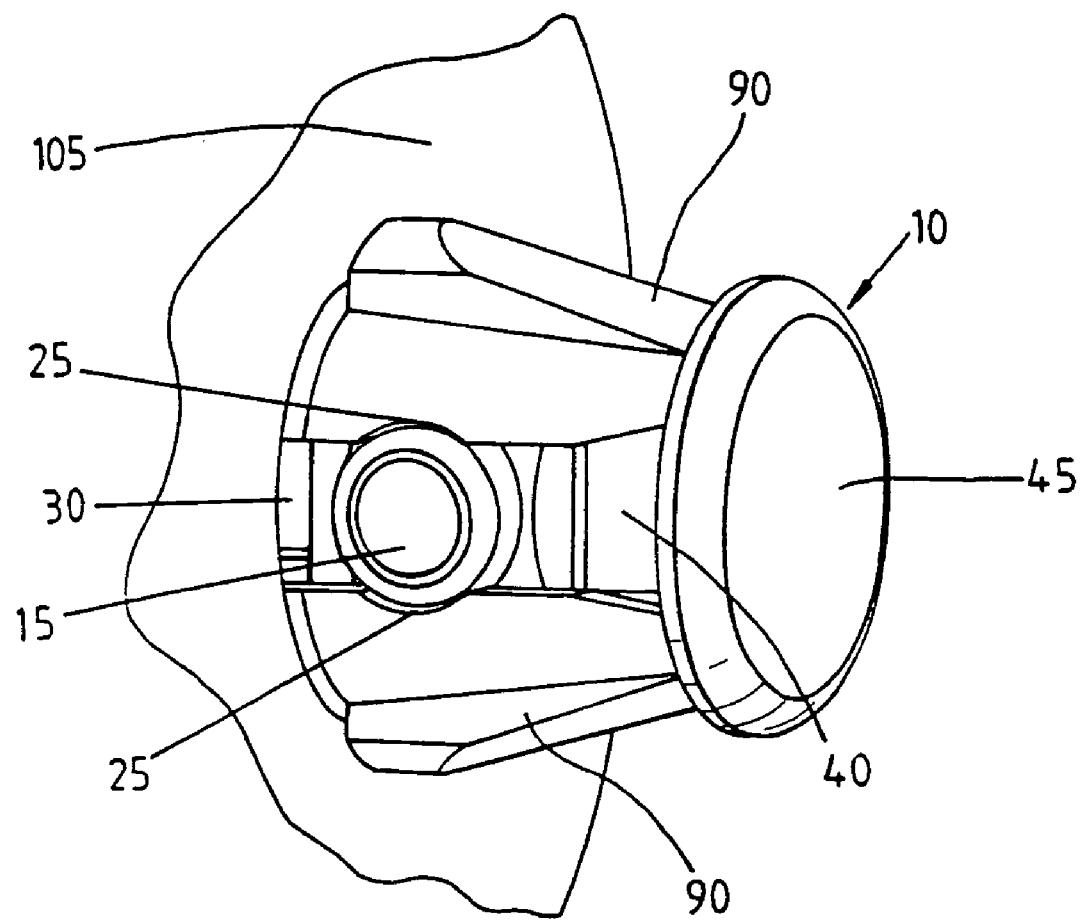
FIG. 4 is a perspective view of the control unit of FIG. 2 illustrating the interaction of the plug and centre-pin (region 'A') in greater detail.
Figure 5A:
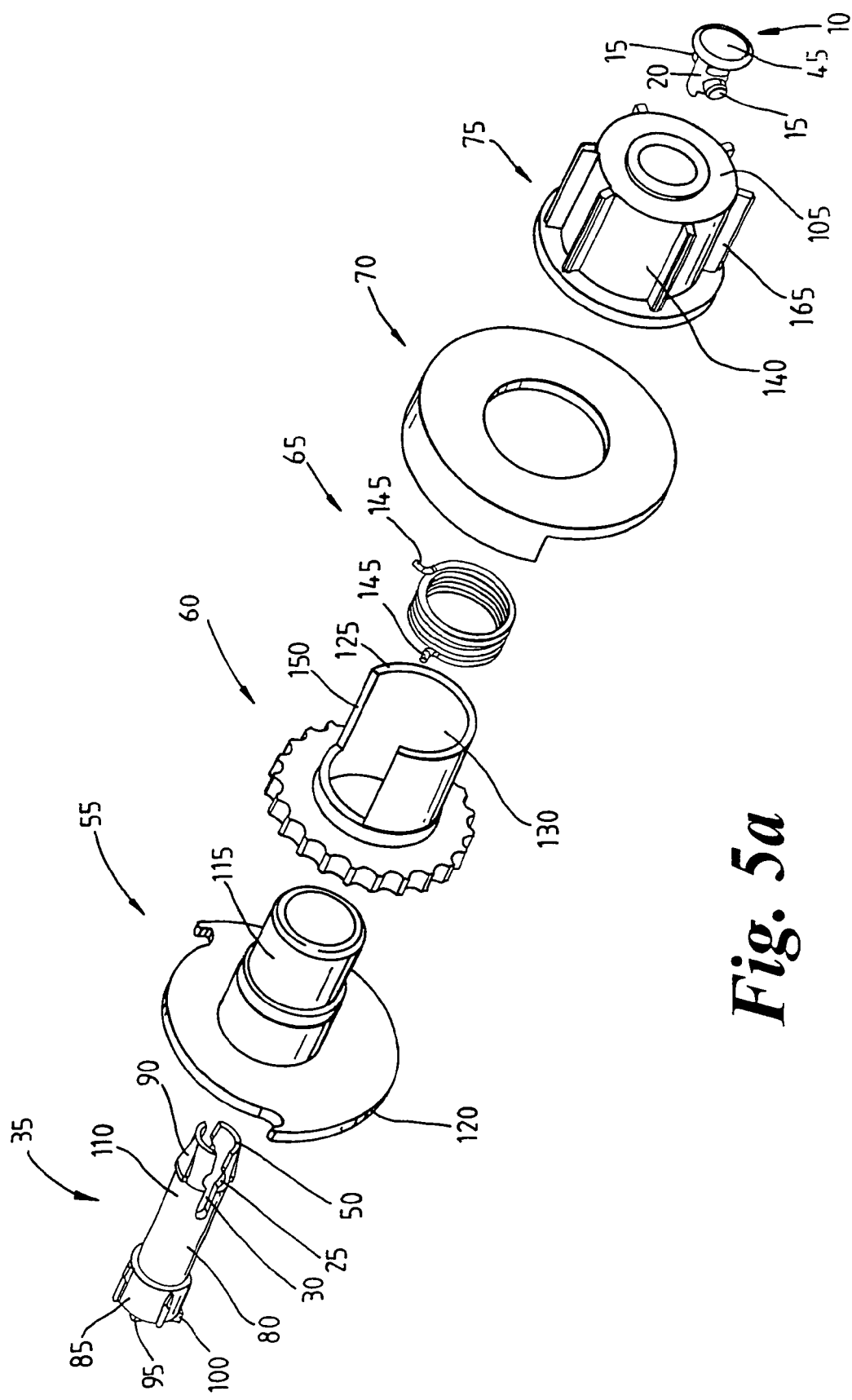
FIGS. 5a and 5b are exploded views of the control unit of FIG. 2.
Figure 5B:
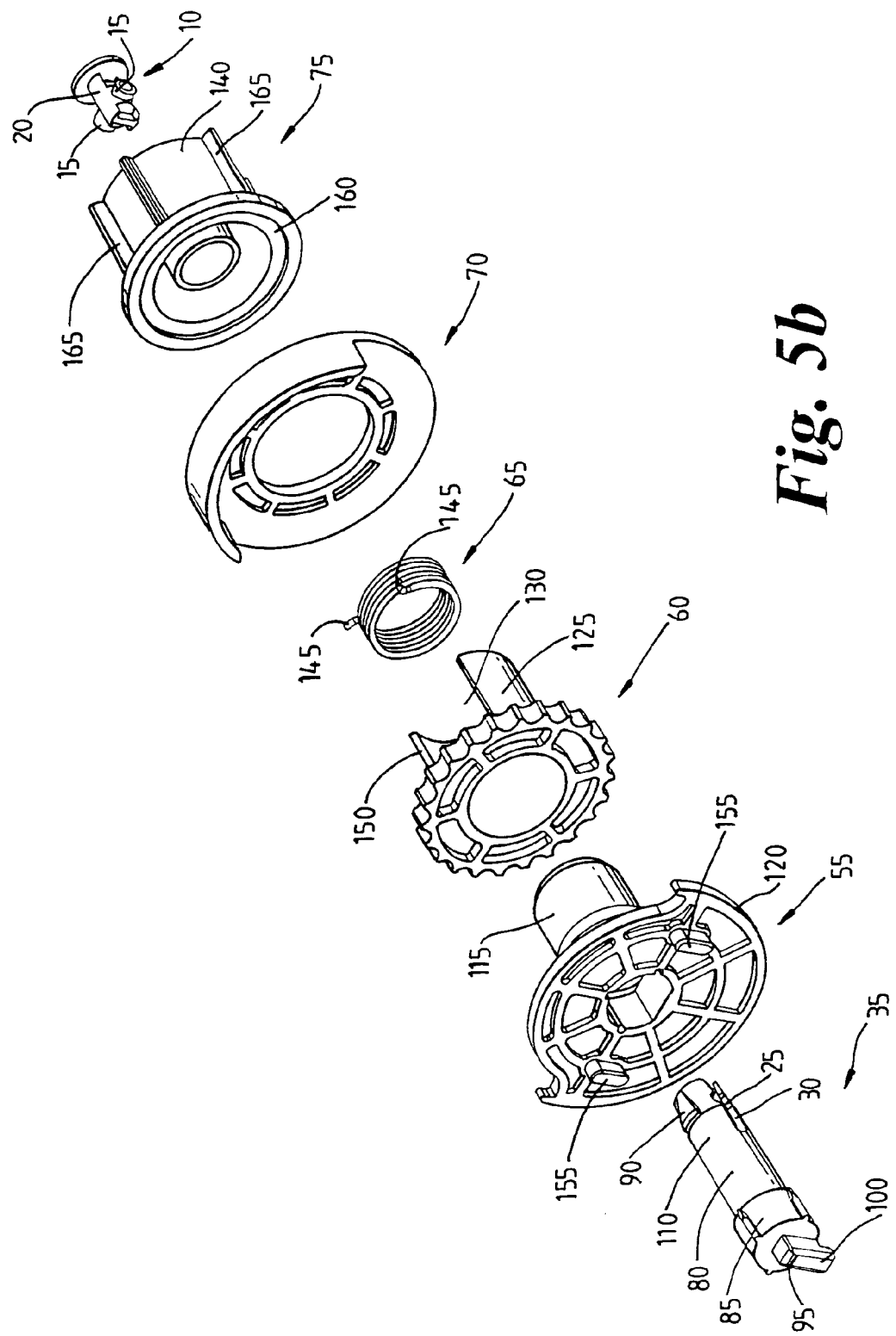

FIGS. 2 to 4 show the plug 10 engaged with the centre-pin 35 of an assembled control unit 5. In use the unit 5 is assembled by aligning the elements of unit 5 as shown in FIGS. 5a and 5b, inserting the centre-pin 35 through all elements and allowing it to lock. The control unit 5 generally comprises a sprocket support 55, a sprocket wheel 60, a wrap spring 65, a chain guard housing 70 and a splined bush 75.

There is a central bore through each component of the control unit. This bore is designed to receive centre-pin 35. Accordingly, the centre-pin 35 holds the components together by extending substantially through the centre of control unit 5 from the face of the control unit 5 incorporating the sprocket support 55 to the rear of the unit 5. In this embodiment, the body 80 of the centre-pin is generally tubular and has a tip 50 distal to the head 85 of the centre-pin. The tip 50 includes two locking lugs 90 over which splined bush 75 snaps into position. The centre-pin 35 is of plastics construction.

The head 85 of the pin 35 forms a stop element in the form of co-operating flattened surfaces in what is otherwise a tubular interface between the centre-pin 35 and the sprocket support 55. The head 85 engages the sprocket support 55 and includes locking means 95 which connects with the mounting bracket (not shown). There is a hooked tip 100 on the locking means 95 of the centre-pin 35 head 85 which prevents the blind from being pulled out of the bracket if the chain (not shown) is pulled at a non-orthogonal angle from the aperture of the chain guard housing 70.

At the tip 50 of the centre-pin 35 are two locking lugs 90, separated by an elongate recess 30. The splined bush 75 snap fits over the centre-pin tip 50 whereby the locking lugs 90 engage a centre-pin engagement surface 105 of the splined bush 75. In this example, the locking lugs 90 are wedge shaped and the maximum annular height of the wedge is at a point towards the head 85 of the centre-pin 35 reducing along the length of the centre-pin 35 towards almost nothing the tip 50.

The arms 110 of the centre-pin 35 are biased towards an open position which is substantially parallel with the body 80 of the centre-pin 35. However, during fitting of the splined bush 75 over the locking lugs 90 these may be deformed resiliently towards each other and into the space provided by the elongate recess 30. This allows the splined bush 75 to be pushed over the locking lugs 90, and for the lugs 90 to snap fit into engagement with the engagement surface 105 of the splined bush.

Once the splined bush 75 is snapped into position plug 10 may be interlocked with the centre-pin 35. The two opposing indents 25 of the elongate recess 30 can releasably engage the engaging members 15 of the plug 10. The indents 30 are positioned so that the cap 45 of the plug 10 rests against the tip 50 of the centre-pin 35 when the engaging members 15 of the plug 10 and the indent 30 are interlocked.

Sprocket support 55 comprises a roughly cylindrical portion 115 which forms a sprocket spring friction surface. The external face of the sprocket support, is formed by collar 120. Sprocket wheel 60 has a tubular portion 125, in which is located a cutaway portion 130. Splined bush 75 has a moulded indent portion which projects generally radially inwards from the general cylindrical body 140 of the splined bush 75. When assembled, pulling on the chain (not shown) causes rotation of the sprocket wheel 60.

A steel wrap spring 65 which engages in turn both the sprocket support 55 and sprocket wheel 60 controls the speed of rotation. Wrap spring 65 terminates in juts 145, which project radially outwards. In the assembled unit, juts 145 are located in the axial gap between sprocket support friction surface 115 and the inner surface of tubular portion of sprocket wheel 60; more specifically, they sit in the gaps between edges 150 of cutaway portion 130 of the sprocket wheel 60, and moulded indent of splined bush 75.

Wrap spring 65 rests on sprocket spring friction surface 115, and tightly grips it when the chain wheel 60 is static. When the chain is pulled and sprocket wheel 60 is caused to rotate, this eventually causes an edge 150 of cutaway portion 130 to abut against a side of moulded indent. Rotation of sprocket wheel 60 does not instantaneously cause rotation of splined bush 75, since cutaway portion 130 always represents a greater portion of arc in size than does moulded indent, so there is always some play between then until rotation of the sprocket wheel 60 eventually causes rotation of splined bush 75.

In addition, as has been indicated earlier, in the assembled unit juts 145 of the wrap spring 65 are located between the edges 150 of cutaway portion 130 and the sides of moulded indent. Rotation of sprocket wheel 60 which causes abutment of an edge 150 of cutaway portion 130 against a side of moulded indent also causes at the same time a jut 145 to be pushed in a direction which effectively opens wrap spring 65 to temporarily release its relatively tight grip on sprocket spring friction surface 115. When the rotation force on sprocket wheel 60 is ceased, so is the rotational force on jut 145, which allows wrap spring 65 to return to its normal relatively tight grip on sprocket spring friction surface 115.

Sprocket support 60 includes two engaging pins 155 projecting from the external face of sprocket support 120 and aligned at the outside edge of the external face of sprocket support 120 with long axes parallel to one another and parallel to the locking means 95 of the centre-pin head 85. Engaging pins 155 and the locking means 95 are received by cooperating recesses in a mounting bracket when the blind is installed.

The splined bush 75 snap fits over the centre-pin 35 whereby the locking lugs 90 of the centre-pin 35 engage the centre-pin engagement surface 105. The splined bush 75 is of one-piece plastics construction. Splined bush 75 comprises a cap front 160 which lies adjacent to the rear face of chain guard housing 70 in use. Extending through the control units, away from chain guard housing 70, the cap front 160 is connected to a roughly cylindrical portion 140 the external surface of which incorporates a series of splines 165. It is this surface which provides purchase on, and causes rotation of, the roller blind tubing. This cylindrical portion 140 of the splined bush 75 also comprises a moulded indent of width about $\frac{1}{8}^{th}$ the circumference of the cylindrical portion 140. The most rearward portion of splined bush 75 is the centre-pin locking lug engagement surface 105 and it is this interaction with centre-pin locking lugs 90 that holds the control units together during operation.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

The invention claimed is:

1. A control unit for use in a window blind head rail assembly comprising:
    a sprocket wheel,
    a sprocket support and wrap spring or springs,
    a splined bush for engagement with a roller blind tube,
    a centre-pin, and
    a plug for releasable engagement with the centre-pin; wherein the plug and centre-pin form a releasably inter-engaging combination whereby insertion of the centre-pin through the control unit and engagement with the plug ensures that a tip of the centre-pin engages an external surface of the splined bush, said plug having a first end defining a cap that is positioned proximate and external to said tip of the centre-pin upon full engagement between said plug and said centre-pin, a second end opposite to said cap, a shaft extending from said first end to said second end, said cap extending radially outwardly from said shaft, and at least one engaging member extending radially outwardly from said shaft, said engaging member located externally of said splined bush.

2. A control unit according to claim 1 wherein the plug comprises two engaging members.

3. A control unit according to claim 2 wherein the two engaging members are positioned on opposed sides of the shaft of the plug.

4. A control unit according to claim 1 wherein the engaging member is shorter than the shaft of the plug.

5. A control unit according to claim 1 wherein the engaging member of the plug is of substantially circular cross-section.

6. A control unit according to claim 1 wherein the cap is a disc having a diameter greater than the shaft of the plug.

7. A control unit according to claim 1 wherein the plug includes recessed regions in the shaft.

8. A control unit according to claim 1 wherein the plug is produced by injection moulding.

9. A control unit according to claim 1 wherein the centre-pin comprises a head, a body and a tip.

10. A control unit according to claim 9 wherein the head includes a stop element.

11. A control unit according to claim 10 wherein the stop element includes a locking means extending radially outwardly beyond an outer surface of said head.

12. A control unit according to claim 9 wherein the centre-pin tip includes at least one locking lug for engagement with a surface of a splined bush.

13. A control unit according to claim 12 wherein one or more of the locking lugs of the centre-pin tip are substantially wedge shaped.

14. A control unit according to claim 13 wherein the maximum annular length of the one or more wedge shaped locking lugs is at a point towards the head of the centre-pin.

15. A control unit according to claim 12 wherein there are two centre-pin locking lugs.

16. A control unit according to claim 12 wherein the centre-pin locking lugs are separated by an elongate recess.

17. A control unit according to claim 16 wherein the elongate recess additionally comprises indents for interlocking with the engaging member.

18. A control unit according to claim 17 where there is an indent positioned on each side of the elongate recess.

19. A control unit according to claim 17 where one indent is positioned substantially opposite a second indent in the elongate recess.

20. A control unit according to claim 9 wherein the head of the centre-pin includes fins.

21. A control unit according to claim 1 additionally comprising a chain guard housing.

22. A combination according to claim 6 wherein the disc operably abuts the tip of the centre-pin upon full engagement between the plug and the centre-pin.

* * * * *